United States Patent [19]

Stroh

[11] Patent Number: 5,403,175

[45] Date of Patent: Apr. 4, 1995

[54] BLOW MOLDING MACHINE FOR THE MANUFACTURE OF HOLLOW PLASTIC PIECES

[76] Inventor: Karl H. Stroh, Am Schülerheim 23a, 14195 Berlin 33, Germany

[21] Appl. No.: 92,787

[22] Filed: Jul. 19, 1993

[30] Foreign Application Priority Data

Jul. 17, 1992 [DE] Germany .................. 42 23 484.0

[51] Int. Cl.⁶ .................................... B29C 49/04
[52] U.S. Cl. ...................... 425/190; 425/532
[58] Field of Search .......... 425/532, 541, 540, 192 R, 425/190, 185, 186, 376.1

[56] References Cited

U.S. PATENT DOCUMENTS

| | | | |
|---|---|---|---|
| 2,579,390 | 12/1951 | Mills | 264/536 |
| 2,579,399 | 12/1951 | Ruekberg | 425/536 |
| 3,334,379 | 8/1967 | Settembrini | 425/540 |
| 3,425,092 | 2/1969 | Taga | 425/192 R |
| 3,608,017 | 9/1971 | Cines | 264/529 |
| 3,614,807 | 10/1971 | Lagoutte | 425/532 |
| 3,632,267 | 1/1972 | Kader | 425/540 |
| 3,640,661 | 2/1972 | Gasior et al. | 425/532 X |
| 3,764,250 | 10/1973 | Waterloo | 425/453 X |
| 3,941,542 | 3/1976 | Uhlig | 425/530 |
| 4,195,053 | 3/1980 | Lambarth | 264/533 |
| 4,197,071 | 4/1980 | Salle et al. | 425/142 |
| 4,239,474 | 12/1980 | Nakagawa | 425/525 |
| 4,262,688 | 4/1981 | Bialkowski | 137/242 |
| 4,362,688 | 12/1982 | Nakagawa | 425/532 X |
| 4,569,651 | 2/1986 | Krall | 425/532 |
| 4,679,291 | 7/1987 | Schmeal et al. | 156/249 X |
| 4,738,612 | 4/1988 | Kikuchi et al. | 425/532 |
| 5,030,083 | 7/1991 | Kohno et al. | 425/532 |
| 5,049,061 | 9/1991 | Billoud | 425/522 |
| 5,208,049 | 5/1993 | Hatfield et al. | 425/532 X |
| 5,264,178 | 11/1993 | Yamamura et al. | 425/532 X |

FOREIGN PATENT DOCUMENTS

| | | |
|---|---|---|
| 0256442B1 | 12/1989 | European Pat. Off. . |
| 0399904A1 | 11/1990 | European Pat. Off. . |
| 1392517 | 3/1966 | France . |
| 2927098C2 | 10/1984 | Germany . |

*Primary Examiner*—Richard L. Chiesa
*Attorney, Agent, or Firm*—Penrose Lucas Albright

[57] ABSTRACT

A machine for the manufacture of hollow plastic pieces with several axes located at angles to each other in a three dimensional sense, which includes mold halves for forming a mold chamber, wherein the mold halves are supported so that at least one of them is moved into and out of contact with the other, at an angle between 40° and 60°, and preferably about 45° relative to the horizontal, the extruder, including the extruder head for forming heated preform blanks to be inserted in the mold, being supported by four superposed tables, the upper table being carried on rails on the next lower table so that it can move horizontally in first horizontal directions, the second table being supported by rails on the third lower table so that it can also move horizontally relative thereto, but at right angles to the movement of the first table, the third table being turnable within limits about a swivel or hinge mounted on the lowermost table which has a mechanism for raising and lowering all of the tables simultaneously, whereby the heated preform blanks or hollow tubes being extruded from the extruder head can be positioned for insertion between the mold halves at any desired disposition.

11 Claims, 1 Drawing Sheet

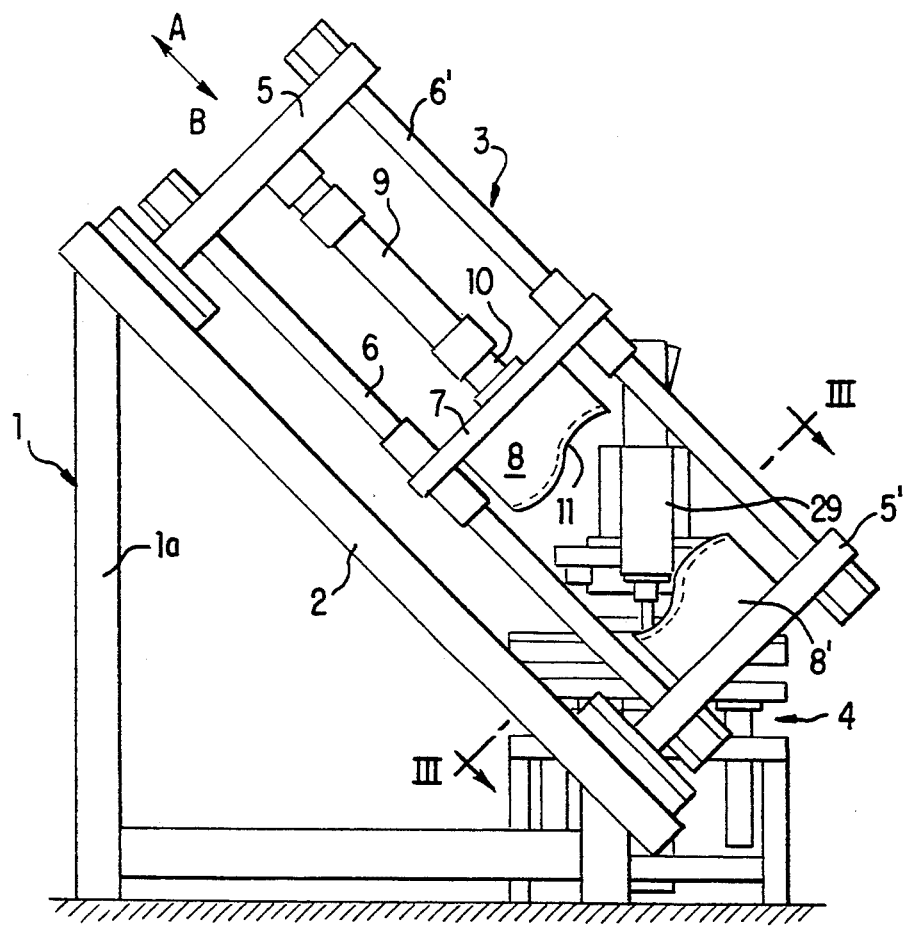
FIG. 1
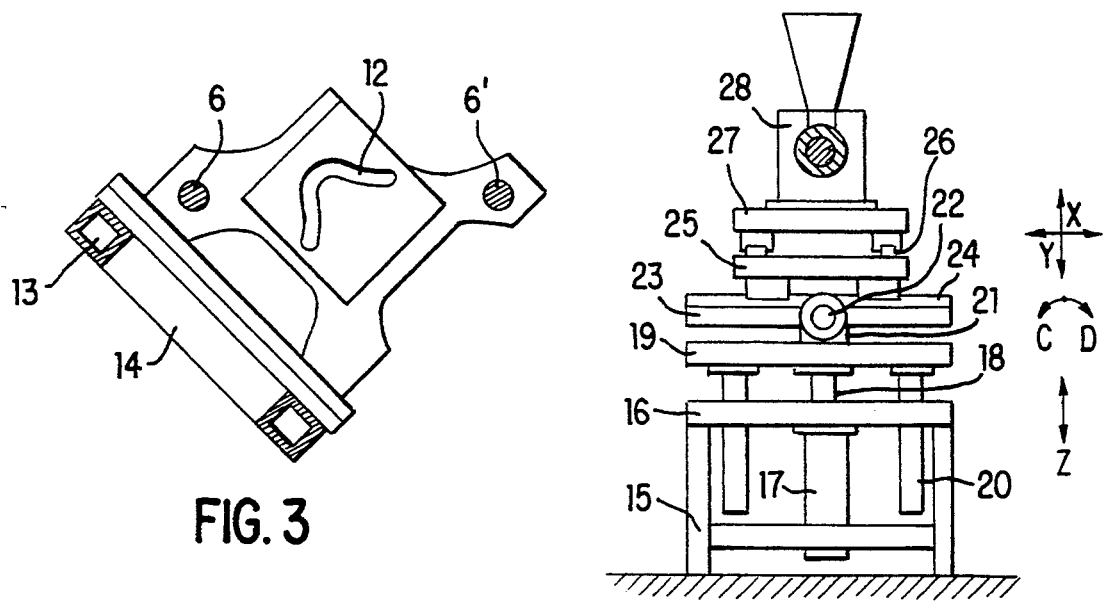
FIG. 3
FIG. 2

BLOW MOLDING MACHINE FOR THE MANUFACTURE OF HOLLOW PLASTIC PIECES

FIELD OF THE INVENTION

This invention relates to a blow molding machine, and, in particular, to a blow molding machine having a mechanism for inserting heated preform blanks between mold halves, in dispositions most favorable for blow molding articles, such as pipe fittings, which have several axes disposed at different angles relative to each other.

BACKGROUND OF THE INVENTION

In the manufacture of hollow plastic pieces by the blow method, powder or granular raw materials are usually first softened in an extruder (or in several extruders for multi-layered hollow pieces) by being heated under pressure, and then molded into a hollow tube, known as a preform blank, and formed with a blow or tube head whereby the tube is attached to an opening from the extruder. The tube is carried so as to be disposed generally vertically downwardly to between separated parts of a blow mold divided in the vertical plane. Next, the mold parts are closed and the preform blank is blown into a hollow piece of the desired shape in the blow mold chamber formed by the closed mold parts. Although articles having more than simply rotation symmetrical can be molded by this method, nevertheless only relatively minor deviations on either side of the plane of symmetry and its axis are permitted. One example of a product that can be so produced is a watering can with a handle. However, special measures must be taken to produce hollow pieces with several axes which are disposed at angles extending in three dimensions in relation to each other, e.g., pipe fittings with several curves or wave shaped curves. Such fittings may have three or more distinctive axes. The articles so produced are currently used extensively in industry, such as the automobile industry. For this purpose, European Patent 0 256 442 B1 teaches that the closing mount of a blow machine be tilted with the mold carrier and the halves of the vertically divided blow mold halves being suspended from the same, together with the motor used to unite and separate the halves, to move about a horizontal axis located outside the middle axis of the closing mount frame, while simultaneously sliding the frame carrying the closing mount on horizontal X- and Y-axes. In a variation of the machine described and illustrated in European Patent 0 256 442 B1, one of the mold halves can also be moved parallel to the other, i.e., moved up and down. By tilting the mold half intended to receive the tube shaped pre-molded part or preform blank in different angle positions, and by moving the closing mount back and forth and from side to side, and if necessary by shifting the height of one mold half opposite the other, the latter can be—with appropriate guidance—presented to the protruding heated tube on preform blank in such manner that a part of the mold chamber, running in a specific direction of the mold chamber, can take up certain parts of the blank without a deviation of the axis. This embodiment, however, has disadvantages in that its construction is relatively complicated, that many heavy parts must be moved, and that it allows little or no space under the closing mount. The introduction of the blowing agent into the pre-molded part located in the mold chamber, and if necessary the so called "calibration," i.e., the determination in relation to the inside diameter, of the collar opening of the blown hollow piece is, in most cases, provided by introducing it from above into the pre-molded part, which here is open. There are also situations, depending on the shape and size of the hollow piece to be produced, in which it appears to be more appropriate to introduce the air supply and/or carry out a calibration from below, i.e., a blow mandrel is introduced into the lower open end of the pre-molded part or blank, and in such cases it is considered a disadvantage if the moving unit supporting the blow mandrel must be moved together with the entire closing mount in order to tilt same.

A blower mechanism, according to German Patent 29 27 098 C2, uses another method. Here, the mold is provided with a horizontal separator, and its closing mount, in addition to opening and closing, moves only as a whole along the Z-axis, i.e., it can only be raised and lowered. Movements along the X and Y axes require sliding the extruder as such, together with the attached blow head. In a modified embodiment, movement along the Z-axis is not provided by raising and lowering closing mount, but rather by moving the blow head vertically opposite the extruder. Whereas in the first embodiment, the horizontally divided mold is hinged, thus making the lower horizontal half of the mold readily accessible to the extruder, after the upper half has been tilted down, in the second embodiment, the lower horizontal mold half is moved away from—on a straight or curved path—the area of the upper mold part located vertically above it to make it accessible to the moving extruder with the blow head. A fundamental disadvantage of this latter device is that it is more difficult to handle and to introduce into the mold chamber a plastic shaped pre-molded tube part, suitable for being blown into a hollow piece, which protrudes horizontally from the blow head nozzle, compared to a tube part which is extruded from the nozzle of the blow head vertically and downwardly, a difficulty which becomes more pronounced in the utilization of mold chambers for hollow pieces having multiple axes.

Another known blow molding apparatus in which the lower horizontal blow mold half is moved on a curved path, usually a circular path, then filled at one station and next closed at another, has the disadvantage that the time needed to bring the upper mold half onto the lower one for effectively closing the mold, is relatively long. Depending on the length of time, the pre-molded part remains in the lower mold half, cooling of the contact surfaces within the mold chamber occurs which can lead to problems during the subsequent blowing operation.

SUMMARY OF THE INVENTION

A purpose of the instant invention is to provide a machine for the manufacture of hollow plastic pieces that have multiple axes, the machine being of a relatively simple construction wherein, when the pre-molded part is extruded vertically downwardly, provision is made for a precise insertion of the pre-molded part into the mold basin of a divided mold for a piece having several axes, without having to move the mold or its lower part that faces the extruded pre-molded part. The invention solves problems of the prior art by supporting the mold halves in a tilted frame and supporting the extruder apparatus on a series of four superposed tables which are movable in the X-, Y- and Z- axes, and one of which is rotatable about a horizontal axis, within limits so that the preform blank can be inserted in the mold in a great variety of selected relative dispositions.

Other objects, adaptabilities and capabilities of the invention will be appreciated by those skilled in the art as the description progresses, reference being had to the accompanying drawings, in which:

BRIEF DESCRIPTION OF THE DRAWINGS

FIG. 1 is a side elevational view of a machine according to the invention;

FIG. 2 is a front elevational view of the extruder unit without blow head and closing mount corresponding to the machine as shown in FIG. 1; and FIG. 3 is a cross sectional view through FIG. 1 along line III—III therein.

DETAILED DESCRIPTION OF THE PREFERRED EMBODIMENT

As seen in FIG. 1, the main parts of the machine in accordance with the invention comprise a frame 1, a table 2, and a mold closing unit 3, as well as an extruder unit 4.

The mold closing unit 3 is essentially a known structure consisting of the two parallel traverses 5 and 5' attached to table 2, between which are supported a pair of parallel guiding shafts or spars 6 and 6' which carry a mold support plate 7 that is movable along spars 6 and 6' in the directions of the arrows A and B. One mold half 8 mounted thereon and plate 7 can be moved rectilinearly towards another mold half 8' to close the mold or, selectively, away from it to open the mold which is formed by mold halves 8 and 8'. For this purpose the non-movable mold half 8' is attached to the traverse 5' or, alternatively, to a special mold clamping plate (not shown) which may be connected to the traverse 5'. Between traverse 5 and the mold support plate 7 a hydraulic or pneumatic reciprocating cylinder and piston combination 9 mounted. When actuated, piston rod 10 is extended to move support plate 7 in the direction of the arrow B to close the mold or in direction of the arrow A to open the mold.

Considering the curved surface 11 of FIG. 1 and the top view of the mold chamber 12 as shown in FIG. 3, it will be appreciated that the hollow piece to be produced may have several axes at an angle with each other in one plane (the mold separating plane) as well as in a plane perpendicular or planes at an angle relative to the one plane.

Table 2 is preferably disposed at 40 to 60 relative to the horizontal and, in the embodiment shown, at about 45.

According to the invention, the mold closing unit 3 is mounted in a stationary oblique or tilted disposition on table 2. As seen in FIG. 3, it includes the slanting longitudinal girders 13 and the transverse beam 14, as a result of which the inner surfaces with the mold chamber, which when closed form the mold, are not in horizontal or vertical positions, but instead are tilted.

Further, according to the instant invention, all movements required for the correct insertion of a pre-molded part into the mold chamber 12, and the devices required for the execution of this movement, are included in the extruder unit 4. This unit, as seen in FIG. 2, comprises a mount base 15 that supports a table 16. A reciprocating cylinder and piston combination 17, which is attached to table 16, raises and lowers with piston rod 18 of combination 17, a frame or further table 19 that has downwardly directed guiding rods 20, which are received in and by corresponding bearing openings in table 16. The extruder thus is moved "up-and-down" along the Z-axis guided by rods 20.

On table 19, bearing blocks 21 are mounted which provide a horizontal axis 22, about which a platform 23 can tilt or swivel together with the extruder, as indicated by the curved arrows C and D. In addition, platform 23 incorporates a pair of parallel rails 24 on which a stand 25, located above platform 23, is carried and along which stand 25 can be moved from left to right and vice-versa, i.e., along the Y-axis. Stand 25 incorporates further rails 26 which movably support and carry an uppermost deck 27 so that it can be moved back and forth along further rails 26, i.e., along the X-axis. Extruder 28, with its blow head 29, is firmly attached to deck 27. Deck 27, stand 25, platform 23, and table 19 comprise, in effect, four superposed tables which permit movement of extruder 28 along the X-, Y- and Z-axes, and to be rotated, within limits, about axis 22.

The above arrangement thus allows extruder 28 and blow head 29, together with the hollow plastic tube mounted on its end to be moved along the X-axis (back and forth), the Y-axis (from side to side) and the Z-axis (up and down), and also to be turned in C and D directions about axis 22. This, in turn, makes it possible to guide the blow head 29 and heated tube mounted therefrom into a selected lower blow mold half 8' and part mold chamber 12 contained in the latter, in almost all imaginable directions and planes so that in each case the preform blank can be introduced, as desired, into the corresponding mold chamber part.

In operation, mold halves 8 and 8' are selected for forming a pipe fitting or other article wherein axes of the molded piece are disposed at angles to each other. These mold halves 8 and 8' are then affixed directly, or via intervening supports, to the plate 7 and the traverse 5' respectively It will be appreciated that a variety of mechanisms for moving stand 25 and deck 27 on rails 24 and 26, mechanical, pneumatic, hydraulic or electrical, or a combination thereof, may be provided as well as for swivelling platform 23 on axis 22, and for controlling the cylinder and piston combination 17, as will occur to one skilled in the art, so that the operator is enabled to position the extruder 28, together with its attached head 29, whereby the extruded preform blanks are received in the mold chamber 12 in the most favorable manner for the ensuing molding process. The mold machine is then placed in operation, the preform blanks being received in mold chamber 12 as desired, whereupon the upper mold half 8 is reciprocated by the piston and cylinder combination 9 to form, with mold half 8' the mold chamber 12 and the preform blank introduced therein is then expanded to conform to mold chamber 12, the mold half 8 thereafter being withdrawn, the molded article being removed and the cycle is repeated.

Although I have described the preferred embodiment of my invention, it is to be understood that it is capable to other adaptations and modifications within the scope of the following claims:

Having thus described my invention, what I claim as new and to be secured by Letters Patent of the United States is:

1. A blow molding machine for the manufacture of hollow plastic pieces having a plurality of axes at different angles to each other comprising:

a closing unit, said closing unit supporting a divided blow mold, said closing unit having means for moving at least one of said mold halves of said divided blow mold back and forth to open and close said blow mold, said closing unit comprising relatively affixed lower half of said blow mold, spars in said closing unit slidably supporting the upper half of said blow mold;

an extruder having an attached head for extruding preform blanks substantially vertically and downwardly, means for moving said extruder horizontally in two directions which are perpendicular to each other, said extruder further being provided with tilting means, whereby said extruder, including said preform blank head, can be tilted within limits around an axis; said means for moving said extruder horizontally in two directions comprising a plurality superimposed table means, the lowest of said table means including means for raising and lowering said extruder; the next lowest said table means including said tilting means for being swivelled about said axis which is located substantially horizontally, the next highest of said table means being positioned above said next lowest table means and having means for being moved in horizontal direction, and the uppermost of said table means supporting said extruder and having means for being moved in further horizontal directions at right angles to the first mentioned horizontal directions: and said mold closing unit with said affixed lower mold half being mounted on a tilted table having a fixed oblique angle.

2. A blow molding machine in accordance with claim 1, wherein the fixed slant of said table is at an angle which is in a range of 40° to 60° relative to the horizontal.

3. A blow molding machine in accordance with claim 1, wherein the slant of said table which supports the mold closing unit is at an angle of about 45° relative to the horizontal.

4. A blow molding machine for the manufacture of hollow plastic articles having a plurality at axes of different angles to each other comprising:

a closing unit, said closing unit supporting a divided blow mold having at least two mold parts and having means for moving at least one of said mold parts of said divided blow mold back and forth to open and close said blow mold;

an extruder having an attached head for extruding preform blanks, said extruder head extruding preform blanks substantially vertically and downwardly therefrom into at least one of said mold parts;

means for moving said extruder horizontally in two directions which are perpendicular to each other, said moving means comprising a plurality of superimposed table means, the lowest of said table means including means for raising and lowering said extruder including said attached head, the next higher of said table means including means for being moved in first horizontal directions, and the uppermost of said table means supporting said extruder including said attached head and having means for being moved in second horizontal directions which are at right angles to said first horizontal directions.

5. A blow molding machine in accordance with claim 4 wherein between said lowest of said table means and said next higher table means, tilting means are provided which swivel said extruder including said attached head about a horizontally positioned axis.

6. A blow molding machine in accordance with claim 4, wherein said closing unit is affixed at an inclination which is at an angle in the range of forty degrees to sixty degrees relative to the horizontal.

7. A blow molding machine in accordance with claim 4, wherein said closing unit is at an inclination of about forty-five degrees relative to the horizontal.

8. A blow molding machine for the manufacture of hollow plastic articles having a plurality of axes at different angles to each other which comprises:

a closing unit, said closing unit supporting a divided blow mold having two mold halves, said closing unit having means for moving at least one of said mold halves of said divided blow mold back and forth to open and close said blow mold;

an extruder having an attached head for extruding preform blanks into a cavity of at least one of said mold halves;

an assembly of table means for carrying and supporting said extruder including said attached head so that said attached head extrudes preform blanks substantially vertically downwardly into said cavity, said assembly of table means comprising a plurality of superimposed table means, wherein the lowest of said assembly of table means includes means for raising and lowering said extruder, including said attached head, and a higher of said assembly of table means which is positioned over said lowest table means and is supported and carried thereby includes means for being moved in a plurality of horizontal directions, two of said directions being displaced from each other by at least ninety degrees, said higher of said table means supporting and carrying said extruder together with said attached head whereby they are moveable as a unit together with said higher table means simultaneously in both substantially vertical and horizontal directions respectively by the means for raising and lowering of the lowest of said table means and by the means for moving said higher table means in horizontal directions.

9. A blow molding machine in accordance with claim 8, wherein between said lowest table means and said higher table means, tilting means are provided which swivel said extruder and said attached head as a unit.

10. A blow molding machine in accordance with claim 8, wherein said closing unit is positioned at a fixed inclination which is at an angle in a range of forty degrees to sixty degrees relative to the horizontal.

11. A blow molding machine in accordance with claim 8, wherein said closing unit is positioned at a fixed inclination of about forty-five degrees relative to the horizontal.

* * * * *